Patented Mar. 30, 1954

2,673,824

UNITED STATES PATENT OFFICE 2,673,824

PROCESS OF PRODUCING VAPOR PERMEABLE FLUID REPELLENT FABRICS

Lawrence P. Biefeld, Granville, and Albert R. Morrison, Newark, Ohio, assignors to Owens-Corning Fiberglas Corporation, Toledo, Ohio, a corporation of Delaware No Drawing. Application August 26, 1949, Serial No. 112,652

5 Claims. (Cl. 154—128)

This invention relates to the manufacture of vapor permeable, fluid or water repellent fabrics and a method for producing the same. More particularly, it relates to the fabrication of a vapor permeable, water repellent fabric which finds excellent use for tarpaulin, awnings, and other structural and insulation items. The product of this invention has leather-like characteristics and is adaptable for use in the manufacture of wearing apparel, luggage, purses, upholstery, bookbindings, and the like.

Primary importance is directed to the vapor permeability and fluid repellency of the fabric because these characteristics measure the comfort with which apparel made therefrom may be worn. These characteristics are important where it is necessary for the fabric to breathe; that is, permit the passage of vapors and still shed water, as in tenting, seat covers, and the like. This is apparent to all who have worn rubber gloves, a rubber raincoat, or who have been confined in a tent of rubberized material. It is desirable for the above uses and for many other uses to have a material which in addition to vapor permeability and fluid repellency has the physical characteristics of high tensile and tear strength, wear and scuff resistance, and weather and vermin resistance. Some importance is also directed to the non-inflammability, heat, chemical and electrical resistance, as well as to the dimensional stability of the product.

At the present time, we are unaware of any one material or combination of materials which meets all of the above characteristics. Leather is widely used for many of the described applications but, in many respects, it is unqualified and is used merely because more suitable materials are not available. Leather, though vapor permeable, is not water impermeable. In fact, water soaks into leather without any difficulty and is transmitted therethrough without the application of external forces. Many attempts have been made to make leather water repellent but, in the main, they have been unsuccessful. Leather, in addition, is relatively soft; it has relatively poor wear, abrasion, and scuff resistance.

It is an object of this invention to produce a vapor permeable, fluid impermeable fabric which meets most, if not all, of the above characteristics and which is particularly well adapted for use in the described applications.

Another object is to produce and to provide a method for producing a water repellent, vapor permeable fabric having leather-like characteristics and which, in reality, is a vast improvement over leather in many respects.

We have been successful in producing a new and improved fabric having a novel arrangement of glass fibers and high polymeric substances to produce a vapor permeable, water or fluid repellent substance which is a vast improvement over leather in many respects. Many of the characteristics which we obtain in the fabric of this invention result from the use of glass fibers as an essential element.

By the use of glass fibers in high proportions we have secured the desirable properties of exceptional strength both in tension and flexure. The fabric also has excellent elasticity, hardness, and flexure endurance. Because glass fibers are formed of inorganic siliceous materials, the characteristics of inertness, weather and heat resistance, non-inflammability, dimensional stability, and electrical insulating properties are imparted to the fabric.

We have been aware of the many excellent characteristics of glass fibers. In the attempt to make use of glass fibers, we have been faced with the usual difficulty of incorporating glass fibers with high polymeric substances in a manner to receive advantage of the glass fiber properties without in any way affecting the vapor permeability and water or fluid repellency of the fabric.

It is an object of this invention, therefore, to produce a new and improved permeable, water or fluid repellent fabric reinforced with glass fibers and which, as a result, is greatly improved in physical characteristics by the presence of glass fibers.

In carrying out our invention, we prepare, as a base fabric, a foraminous fabric consisting essentially of glass fibers and a high polymeric substance which is selectively impermeable to water and other fluids and which is capable of subsequent flow. Subsequently, the high polymeric substance is caused to flow to reduce the foramens of the fabric to pore-like dimensions through which vapors, but not fluids or water, may transmit. In the event that greater impermeability is desired or in the event that some of the pore-like openings are too large, the fabric may be treated with a substance which is a repellent for water or other fluids. The repellent, more often, is incorporated with the high polymeric substance to increase its repellency or resistance, and, when desired, the fabric formed therewith may be further treated to provide a high concentration of the repellent on exposed surfaces.

The foraminous base fabric, composed of high polymeric substances and glass fibers with or without a repellent agent, may be formed in many ways. The fibers may be coated with the full complement of high polymeric substance and then formed into a fabric. Coated fibers may be separately deposited in haphazard or jackstraw arrangement to form a mat or preform in which self-sufficiency is secured by felting, by the use of a binder which may be the coating material itself, or by a combination of such system. Instead of forming a mat of the individual fibers in haphazard arrangement, the coated fibers may be spun into a woven fabric or bundles of coated fibers may be combined in yarn or strand form for weaving or knitting into a fabric. Alternatively, a multiplicity of untreated fibers may be formed into skeins, yarns, or strands prior to coating and the coated bundles may then be formed into fabrics by the usual methods of weaving or knitting.

By another method, a mat, textile, or knitted fabric may be formed of untreated fibers and then the fabric may be treated with high polymeric substances to coat the fibers substantially throughout their length but insufficiently to fill all of the interstices between the fibers. In the alternative, the fibrous fabric may be fully impregnated with the high polymeric material and the foramens may thereafter be secured by puncturing the impregnated fabric at numerous points.

Instead of coating the fibers or impregnating the fabric, the foraminous base may be formed of a mixture of glass fibers and synthetic fibers having resinous or rubber-like characteristics capable of subsequent flow. Responsive then to heat or heat and pressure, the synthetic fibers may be caused to flow to reduce the interstices between fibers to pore-like dimensions through which vapors, but not fluids, are able to pass.

In any event, the base fabric is a foraminous body of glass fibers and high polymeric flowable material which may be caused to flow sufficiently to reduce the foramens to pore-like dimensions. In this combination, it is unnecessary that all of the fibers be either glass or synthetic. It is possible to substitute a small amount of natural fibers, such as cotton, wool, silk, and the like, but their use in excessive amounts is not encouraged because they tend to absorb water unless fully impregnated with high polymeric substances. To secure full impregnation of porous natural fibers requires appreciably more resinous material and injects the possibility that the forces required to effect the desired impregnation may cause excessive flow of the high polymeric substance to the extent that a full barrier may be established through which neither vapors nor water can flow. Although we may use glass fibers ranging from 3 to 20 microns or more in diameter, the fuzzy or interstitial closing characteristics secured by the use of a large proportion of ultra-fine fibers of less than 3 microns are instrumental in the production of leather-like products of exceptional value. Certain desirable features are also secured when milled or cut fibers or short lengths are incorporated in the coating or impregnating compositions of the high polymeric substance.

As the high polymeric substance, use may be made of hardenable resinous materials of the thermosetting type reacted to less than the full extent of polymeric growth, such as the "A" or "B" stage phenolic resins or partially reacted urea type nitrogenous resin forming substances; thermoplastic resinous materials reacted to the full extent or less than full extent of polymeric growth; and rubber-like elastomers capable of subsequent flow and/or vulcanization; and combinations of these materials with each other.

It is preferred to use a thermoplastic resinous material that gives flow of the desired character responsive to heat, heat and pressure, or sometimes pressure alone. When the fibers serve as a reinforcing agent, a resinous or rubber-like material strongly adherent to the glass fibers is selected.

Representative of suitable thermoplastic resinous materials are the polymeric vinyl derivatives including polyvinyl chloride, polyvinyl acetate, vinyl chloride-vinyl acetate copolymers, polyvinyl acetals, polyvinylidene chloride, and copolymers thereof with vinyl chloride; polyacrylates, such as methyl methacrylate, ethyl acrylate, butyl methacrylate, and the like; polyamides (nylon), polyethylene, polystyrene, and the like. As the rubber-like material, use may also be made of butadiene-acrylonitrile copolymers (Buna N) and mixtures thereof with phenolic resins compatible with the elastomer and present in the ratio of one part elastomer to .5 to 2 parts phenolic resin; butadiene-styrene copolymers (Buna S), chlorinated rubber, rubber hydrochloride, isoprene (neoprene), and the like. Novel and highly beneficial characteristics are also secured by combinations of glass fibers and organosilicon resinous materials or elastomers.

It will be understood that other than the fact that these materials have common characteristics of flow under reaction conditions, imperviousness to selected fluids of which it is desired to prevent penetration, and that they form a continuous phase in the final product, they are in reality not full equivalents.

In most instances, it is desirable to employ flexible modifications of high polymeric substances, especially when relatively thick or built-up fabrics are to be produced. In this event, the harder modifications of the above and related materials may be softened with plasticizers. Suitable plasticizers of the desired amount for the various resinous and rubber-like materials may be selected without recourse to extensive experimentation. Other additives, such as pigments, dyes, modifying resins, and heat stabilizers, may also be added to impart certain characteristics without departing from the spirit of the invention.

Coating of individual fibers, strands, or yarns may be effected in conjunction with their forming operations or in separate application subsequent to the forming operation. In such applications, the high polymeric substance is usually applied from solvent solution, or from emulsion or dispersion in aqueous or solvent medium. Usually the solids content is in the order of 10 to 50 per cent by weight, enabling application by usual means, such as by wiping the coating composition onto the fibers, spraying the composition onto the fibers as they fall through a collecting chamber or as they gather as a mat on a collecting belt, or by submerging the fibers into the coating composition. One or more applications may suffice to deposit the desired amount of high polymeric substance onto the fibers. Air drying is sufficient to harden the high polymeric substance on the fiber surfaces, but, more often, it is desirable to expose the fibers with their coating composition to subatmospheric conditions and/or to elevated temperatures in the order of 200° to 350° F. to hasten the removal of the diluent. When discrete particles are deposited from emulsion or dispersion, elevated temperatures operate also to fuse the discrete particles to form a continuous high polymeric phase.

Partial or full impregnation of a formed base fabric of glass fibers may be accomplished in the usual manner by the use of dilute solutions or dispersions of the high polymeric substance. When a knife coating, roller coating process, or the like is used to effect impregnation, higher concentrations in the range of 75 to 90 by weight high polymer in the coating or impregnating composition may be used. These compositions are commonly called hydrosols or organosols dependent on whether the external phase is water or organic solvent. Coating compositions of 100 per cent concentrations may be used, such as the plastisols. The treated fabric may be air dried or subjected to elevated temperatures for the removal of the diluent. If a heat hardenable polymer is employed as the impregnant, care should be taken not to use such temperatures or conditions as will advance the substance beyond flowable condition.

The ratio of high polymeric material to glass fibers necessary to give the desired porosity in the final product depends on the type of fabric used. More polymer is required for open-weave fabrics and less for closely woven fabric and felted mats. Volumetrically, the final product is constituted of about 20 to 65 per cent voids with the remaining solids being present in the ratio of about 10 parts by volume of glass fibers to 5 to 50 parts by volume of the high polymeric substance.

The formed foraminous base sheet ordinarily has pores larger than desired. To reduce the pores to small dimension through which vapors but not fluids or water may travel, the high polymeric substance is caused to flow. If the substance is subjected to cold flow, the desired reduction of the size of the pores or foramens may be effected by pressure alone, as developed between platens of a compression press. If thermoplastic, the desired flow may be effected by heat alone. It is best, however, to employ both heat and pressure developed by platens or cooperating rollers to effect flow of the desired character. The temperature employed depends on existing conditions and the softening temperature of the high polymeric substance. It may be the softening temperature for the particular polymer, but more often the temperature employed is above the softening temperature and may exceed it by as much as 100° F. A cooling step may be used to set the high polymeric material after flow and to enable the removal of the finished fabric from the pressure generating means.

When a relatively thick or built-up fabric is desired, two or a plurality of base fabrics may be combined in superposed relation and combined in the manner of a laminate. Ordinarily, the flow developed during lamination under pressure or heat and pressure is sufficient to bond the layers and reduce the foramens to the desired pore-like dimensions. When layers are thus combined, the possibility of having large foramens through the finished product is greatly minimized.

Flexibility in a built-up fabric is secured without danger of rupture or cracking when the fibers of the base fabric are able to move relative to each other, such as in a mat or knitted fabric. Square weaves are suitable for thin sections and thin laminates.

Vapor permeability and water repellency of the fabric may be influenced by the use of a water repellent or hydrophobic substance. This substance may be applied to the fibers before coating or impregnating the fibers with the high polymeric material; it may be incorporated into the coating or impregnating composition; or it may be applied to the product after the pore-size has been reduced by the described flow step. Suitable water repellent or hydrophobic treating compositions comprise dilute water or solvent solutions, emulsions, or dispersions of one or more of the following materials or mixtures thereof:

A. An organo-silicon of the type silane, represented by chlorosilane, alkyl halogen silanes, such as methyl trichlorosilane, octadecyltrichlorosilane, didodecyldichlorosilane; polysiloxane fluids of low molecular weight, such as methylpolysiloxane, methyl ethylpolysiloxane, methyl phenylpolysiloxane, and the like.

B. Werner or chrome complexes of the type described in the patent to Iler, No. 2,273,040, in which the acido group coordinated with the trivalent chromium atom has more than 8 carbon atoms.

C. Cationic-active amine complex compounds of the type described in the patent to Sloan, No. 2,356,542, in which the organic group associated with the basic nitrogen, phosphorous, or sulphur atom has more than 8 carbon atoms.

D. Metallic soaps, oils, waxes, and mixtures thereof.

It is sufficient when 0.5 to 2.0 percent of the water repellent is present in the final product although more may be used when desired. For application to the fibers as a size, or to the product of the flow step, a treating composition containing 2 to 10 per cent water repellent may be used.

By way of illustration but not of limitation, the following examples are given to describe how this invention may be practiced:

Example 1

Impregnating composition:

2.5 Buna N (butadiene-acrylonitrile copolymer)
7.5 phenol formaldehyde resin
2.5 methyl polysiloxane (water repellent)
87.5 methyl ethyl ketone A knitted fabric of glass fibers in yarn form is treated with the impregnating composition to coat the fibers substantially throughout their length but insufficiently to fill the interstices between the fibers after the solvent has been removed. After air drying, four layers of the impregnated fabric are laminated together under 120 pounds per square inch pressure for thirty minutes at 320° F. Because of the porosity, the resulting fabric contains about 37 per cent by volume glass fibers and 28 per cent by volume impregnant. The contact angle of the products with water is about 135% F. and the products are sufficiently vapor permeable and water repellent without the use of a water repellent agent.

When equal parts of Buna N and phenolic resin are used in the impregnating composition, a desirable laminate is formed of 24 plies and the product has pores extending therethrough of a size to enable vapor permeability and water repellency and has about 12 per cent by volume of glass fibers and 22 per cent by volume of the resinous materials. When substantially equal parts of Buna N and phenolic resin are used, a suitable product formed of five plies is constituted of 34 per cent by volume of glass and 46 per cent by volume of the high polymeric substance.

*Example 2*

Impregnating composition:

40.0 Buna S. (butadiene-styrene copolymer)
10.0 polystyrene
2.0 methyl polysiloxane
48.0 water Strands of glass fibers are coated with the full complement of the high polymeric materials comprising substantially equal parts by weight of polymer and glass fibers. The coated strands are dried by passing the coated strands through a tower at 300° F. and a fabric is knitted of the coated strands to enable the fibers to move relative to each other. Five layers of the base fabric are laminated together under 120 pounds per square inch pressure for 45 minutes at 325° F. after which the laminate is removed from the press upon cooling to below 150° F. to set the high polymeric substance.

It will take two pounds pressure per square inch to force water through the laminated fabric, compared to the relatively free flow of water through leather. The vapor permeability of the laminate is substantially equivalent to that of leather.

*Example 3*

Impregnating composition:

5.0 phenolic resin—"A" stage
15.0 polyvinyl acetate (water dispersion)
2.0 methyl phenyl polysiloxane (water emulsion)
0.2 hexamethylene tetramine
77.8 water A mat of fine glass fibers in haphazard arrangement is fully impregnated with the above composition. After drying for thirty minutes at 250° F., the impregnated mat is punctured at numerous places to provide openings through the impregnated mat. The mat is then passed between rolls heated to 350° F. to reduce the openings to pore-like dimensions in the order of 0.03 mil through which vapor but not water is able to pass. The degree of water repellency is further reduced by treating the product described with a water solution of octadecylamine chloride or other cationic-active compound having more than 8 carbon atoms. Instead of a cationic-active compound, a polysiloxane liquid may be used to secure an exceptionally high contact angle.

*Example 4*

Impregnating composition:

39.0 polyvinyl chloride
4.4 butadiene-acrylonitrile copolymer
2.5 methylethyl polysiloxane
54.1 water A woven fabric of glass fibers is treated with the above composition to coat the fibers substantially throughout their length but insufficiently to fill the interstices between fibers. After exposing the coated fabric simultaneously to 250° F. and one-half atmospheric pressure for 15 minutes to drive off the diluent, several layers of the base fabric are laminated together under 120 pounds per square inch pressure for 15 minutes at 300° F. The resulting product requires more than 5 pounds per square inch pressure to force water through and its vapor permeability compares favorably with that of leather.

*Example 5*

Equal parts of glass fibers and synthetic fibers of vinylidene chloride-vinyl chloride copolymer (Saran) are combined in fabric form and several layers of the fabric are laminated together under 150 pounds per square inch pressure for 45 minutes at 350° F. The flow developed by the synthetic fibers is sufficient to secure the layers together and to reduce the interstices between fibers substantially to pore-like dimension. Upon treatment with a hydrophobic agent, such as a 2 per cent solution of aluminum stearate in aromatic solvent, the fabric is able to transmit vapor while repelling the transmission of water.

From the above, it will be apparent that a new and improved fabric having vapor permeability and water or other fluid repellency has been produced. The fabric in single layer form or in laminations of a plurality of layers has leather-like characteristics and, in addition, has many of the desirable physical characteristics of strength, dimensional stability, relative inertness, heat resistance, chemical resistance, electrical resistance, scuff and wear resistance, and fire and weather resistance derived from the fibrous glass component. The permeability may be increased by the use of agents attractive to the vapor and fluids or decreased by the addition of repellent agents described.

It will be understood that numerous modifications may be made with respect to materials, concentrations, and their methods of application without departing from the spirit of the invention, especially as defined in the following claims.

We claim:

1. The method of producing a vapor permeable, water repellent, flexible fabric comprising the steps of treating a web of glass fibers with a liquid composition containing from 10-50 percent by weight resinous solids capable of subsequent flow under heat and pressure to introduce the resin into the web of glass fibers in amounts to provide a ratio of 10 parts by volume fiber to 5-50 parts by volume of the resinous material, heating the treated web to eliminate the diluent leaving the resinous solids with small openings uniformly dispersed throughout the treated web, subjecting the treated web to compression while heating the resinous material to flowable temperature thereby to cause the resinous material to flow and reduce the amount and dimension of the openings to form a fabric having from 20-65 percent voids of microporous dimension through which vapors but not water are able to pass.

2. The method of producing a fabric of the type claimed in claim 1 which includes the additional step of treating the fabric subjected to heat and pressure with a hydrophobic agent to increase the water impermeability of the surfaces of the fabric.

3. The method as claimed in claim 1 which includes the additional step of laminating a plurality of the treated webs together under heat and pressure to form a flexible synthetic leather which is vapor permeable and water repellent.

4. The method of producing a vapor permeable, water repellent, flexible fabric comprising the steps of treating a web woven of glass fibers with a liquid composition containing from 10-50 percent by weight resinous solids capable of subsequent flow under heat and pressure to introduce the resin into the web of glass fibers in amounts to provide a ratio of 10 parts by volume fiber to 5-50 parts by volume of the resinous material, heating the treated web to eliminate the diluent leaving the resinous solids with small openings uniformly dispersed throughout the treated web, subjecting the treated web to compression while heating the resinous material to flowable temperature thereby to cause the resinous material to flow and reduce the amount and dimension of the openings to form a fabric having from 20-65 percent voids of microporous dimension through which vapors but not water are able to pass.

5. The method of producing a vapor permeable, water repellent fabric comprising the steps of treating a web knitted of glass fibers with a liquid composition containing from 10-50 percent by weight resinous solids capable of subsequent flow under heat and pressure to introduce the resin into the web of glass fibers in amounts to provide a ratio of 10 parts by volume fiber to 5-50 parts by volume of the resinous material, heating the treated web to eliminate the diluent leaving the resinous solids with small openings uniformly dispersed throughout the treated web, subjecting the treated web to compression while heating the resinous material to flowable temperature thereby to cause the resinous material to flow and reduce the amount and dimension of the openings to form a fabric having from 20-65 percent voids of microporous dimension through which vapors but not water are able to pass.

LAWRENCE P. BIEFELD.
ALBERT R. MORRISON.

References Cited in the file of this patent

UNITED STATES PATENTS

| Number | Name | Date |
|---|---|---|
| 1,950,662 | Dreyfus | Mar. 13, 1934 |
| 2,197,805 | Lovett | Apr. 23, 1940 |
| 2,252,157 | Bergin et al. | Aug. 12, 1941 |
| 2,273,040 | Iler | Feb. 17, 1942 |
| 2,306,781 | Francis | Dec. 29, 1942 |
| 2,312,227 | Yant | Feb. 23, 1943 |
| 2,335,102 | Bergin et al. | Nov. 23, 1943 |
| 2,349,909 | Meharg | May 30, 1944 |
| 2,356,542 | Sloan | Aug. 22, 1944 |
| 2,428,591 | Slayter | Oct. 7, 1947 |
| 2,439,689 | Hyde | Apr. 13, 1948 |
| 2,474,201 | Raymond et al. | June 21, 1949 |
| 2,575,577 | Beauchamp | Nov. 20, 1951 |